(12) United States Patent
Pao et al.

(10) Patent No.: US 10,690,884 B2
(45) Date of Patent: Jun. 23, 2020

(54) OPTICAL LENS

(71) Applicant: ABILITY ENTERPRISE CO., LTD., New Taipei (TW)

(72) Inventors: Chao-Han Pao, New Taipei (TW); Sih-Han Wu, New Taipei (TW); Shuo-Hsien Cheng, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 220 days.

(21) Appl. No.: 15/911,219

(22) Filed: Mar. 5, 2018

(65) Prior Publication Data

US 2018/0259744 A1   Sep. 13, 2018

(30) Foreign Application Priority Data

Mar. 9, 2017   (TW) .............................. 106107841 A

(51) Int. Cl.
*G02B 3/02* (2006.01)
*G02B 9/64* (2006.01)
*G02B 13/00* (2006.01)
*G02B 9/62* (2006.01)

(52) U.S. Cl.
CPC ................. *G02B 9/64* (2013.01); *G02B 9/62* (2013.01); *G02B 13/0045* (2013.01)

(58) Field of Classification Search
CPC ....................................................... G02B 9/64
USPC ......................................................... 359/708
See application file for complete search history.

(56) References Cited

U.S. PATENT DOCUMENTS

2019/0227277 A1\* 7/2019 Tang ...................... G02B 9/64

\* cited by examiner

*Primary Examiner* — James C. Jones
(74) *Attorney, Agent, or Firm* — McClure, Qualey & Rodack, LLP

(57) ABSTRACT

An optical lens, in order from an object side to an image-forming side, includes a first lens, a second lens, a third lens, a fourth lens, a fifth lens, a sixth lens and a seventh lens. The object-side surface of the first lens has an effective diameter Φ1. The image-side surface of the first lens has a curvature radius R2 and an effective radius D2. The object-side surface of the second lens has an effective diameter Φ2. The optical lens satisfies at least one of the following conditions: 0.2≤Φ2/Φ1, Φ2/Φ1≤0.65, 0.65≤D2/R2 and D2/R2≤1.2.

20 Claims, 6 Drawing Sheets

| Lens | Surface number | Curvature radius (mm) | Thickness (mm) | Refractive index | Material | Abbe number |
|---|---|---|---|---|---|---|
| L1 | S1 | 10.64 | 1.34 | 1.8 | Glass | 45 |
|  | S2 | 3 | 2.1 |  |  |  |
| L2 | S3 | 31.6 | 0.45 | 1.72 | Glass | 54 |
|  | S4 | 1.8 | 1 |  |  |  |
| L3 | S5 | 8 | 1 | 1.92 | Glass | 24 |
|  | S6 | -15 | 0.8 |  |  |  |
| St | St | ∞ | 0.2 |  |  |  |
| L4 | S7 | -5.2 | 1.3 | 1.9 | Glass | 35 |
|  | S8 | -3 | 0.1 |  |  |  |
| L5 | S9 | 4 | 1.7 | 1.5 | Glass | 80 |
|  | S10 | -3.7 | 0 |  |  |  |
| L6 | S11 | -3.7 | 0.4 | 1.9 | Glass | 20 |
|  | S12 | 20 | 0.1 |  |  |  |
| L7 | S13 | 5 | 1.8 | 1.5 | Glass | 70 |
|  | S14 | -3.6 | 1.5 |  |  |  |
| F | S15 | ∞ | 0.3 |  | Glass | 60 |
|  | S16 | ∞ | 0.5 |  |  |  |
| C | S17 | ∞ | 0.5 |  | Glass | 60 |
|  | S18 | ∞ | 0.4 |  |  |  |
|  | I | ∞ | 0 |  |  |  |

FIG. 4A

|  | K | A4 | A6 | A8 | A10 | A12 |
|---|---|---|---|---|---|---|
| S13 | -13 | 5.5E-3 | -3.8E-4 | 6.6E-6 | 1.3E-5 | 3.1E-7 |
| S14 | -9.8 | -1.8E-2 | 5.6E-3 | -9.1E-4 | 7.9E-5 | 2.8E-7 |

FIG. 4B

| Lens | Surface number | Curvature radius (mm) | Thickness (mm) | Refractive index | Material | Abbe number |
|---|---|---|---|---|---|---|
| L1 | S1 | 7.32 | 0.85 | 1.82 | Glass | 50 |
|  | S2 | 2.62 | 1.65 |  |  |  |
| L2 | S3 | 95 | 0.45 | 1.75 | Glass | 55 |
|  | S4 | 1.4 | 0.94 |  |  |  |
| L3 | S5 | 8.53 | 0.95 | 1.9 | Glass | 25 |
|  | S6 | -19.2 | 0.63 |  |  |  |
| St | St | ∞ | 0.25 |  |  |  |
| L4 | S7 | -7.06 | 1.09 | 1.9 | Glass | 35 |
|  | S8 | -5.8 | 0.1 |  |  |  |
| L5 | S9 | 3 | 1.44 | 1.5 | Glass | 80 |
|  | S10 | -3.57 | 0 |  |  |  |
| L6 | S11 | -3.57 | 0.4 | 1.92 | Glass | 22 |
|  | S12 | 6.64 | 0.1 |  |  |  |
| L7 | S13 | 3.26 | 1.51 | 1.55 | Glass | 70 |
|  | S14 | -2.6 | 0.94 |  |  |  |
| F | S15 | ∞ | 0.3 |  | Glass | 60 |
|  | S16 | ∞ | 0.5 |  |  |  |
| C | S17 | ∞ | 0.5 |  | Glass | 60 |
|  | S18 | ∞ | 0.4 |  |  |  |
|  | I | ∞ | 0 |  |  |  |

FIG. 5A

|  | K | A4 | A6 | A8 | A10 | A12 |
|---|---|---|---|---|---|---|
| S13 | -23.96 | 4.88E-3 | -3.49E-2 | 1.64E-2 | -4.15E-3 | 4.38E-4 |
| S14 | -5.2 | -2.53E-2 | 1.08E-2 | -3.28E-3 | 7.719E-4 | -7.73E-5 |

FIG. 5B

|  | Optical lens OL1 | Optical lens OL2 |
| --- | --- | --- |
| F12 | -1.49 | -1.17 |
| F34 | 4.06 | 3.25 |
| F1 | -5.8 | -5.43 |
| F2 | -2.71 | -1.94 |
| F | 1.43 | 1.04 |
| R2 | 3.1 | 2.62 |
| D2 | 2.84 | 2.34 |
| D34 | 1.096 | 0.882 |
| CT3 | 1.19 | 0.95 |
| CT4 | 1.35 | 1.9 |
| ET34 | 0.83 | 0.697 |
| ET4 | 1.05 | 0.596 |
| ET14 | 3.67 | 2.61 |
| BF | 1.503 | 0.942 |
| Φ1 | 11.4 | 4.174 |
| Φ2 | 4.7 | 1.855 |
| D2/R2 | 0.916 | 0.893 |
| F12+F34-D34 | 1.474 | 1.198 |
| δ14 | 0.409 | 0.361 |
| \|F1-F2\|/F | 2.16 | 3.36 |
| TTL (mm) | 15.8 | 21 |
| FoV (°) | 210 | 190 |
| \|D34-ET34-CT3\| | 0.924 | 0.765 |
| ET4/CT4 | 0.78 | 0.31 |
| Φ2/Φ1 | 0.412 | 0.44 |

FIG. 6

OPTICAL LENS

This application claims the benefit of Taiwan application Serial No. 106107841, filed Mar. 9, 2017, the invention of which is incorporated by reference herein in its entirety.

TECHNICAL FIELD

The invention relates in general to an optical lens, and more particularly to an optical lens with compact volume and wide viewing angle.

BACKGROUND

In recent years, due to the ever-changing technology of sports camera, Virtual Reality (VR) device, panoramic camera, aerial photography, etc., it is required to improve the optical image quality of the image capture module for various mobile devices. In addition, due to the light and compact design for mobile device, it is also required to decrease the thickness of the optical lens of the image capture device. Generally, the optical lens consists of a plurality of lenses. In order to be more competitive in the market, miniaturization, high quality and wide viewing angle have always been the goals for product development.

Therefore, it is in need to provide a novel optical lens to achieve an optical lens with miniaturized size and improved image quality at the same time in the condition of the increased viewing angle.

SUMMARY

The invention is directed to an optical lens. In the condition of the increased viewing angle, the optical lens with miniaturized size and improved image quality at the same time is achieved.

According to one embodiment, an optical lens is provided. The optical lens, in order from an object side to an image-forming side, includes a first lens, a second lens, a third lens, a fourth lens, a fifth lens, a sixth lens and a seventh lens. The object-side surface of the first lens has an effective diameter $\Phi 1$. The image-side surface of the first lens has a curvature radius R2 and an effective radius D2. The object-side surface of the second lens having an effective diameter $\Phi 2$. The optical lens satisfies at least one of the following conditions: $0.2 \leq \Phi 2/\Phi 1$, $\Phi 2/\Phi 1 \leq 0.65$, $0.65 \leq D2/R2$, and $D2/R2 \leq 1.2$.

According to another embodiment, an optical lens is provided. The optical lens, in order from an object side to an image-forming side, includes a first lens, a second lens, a third lens, a fourth lens, a fifth lens, a sixth lens and a seventh lens. The first lens and the second lens have negative refractive power. The third lens and the seventh lens have positive refractive power. The object-side surface of the first lens has an effective diameter $\Phi 1$. The object-side surface of the second lens has an effective diameter $\Phi 2$. $0.2 \leq \Phi 2/\Phi 1$ and/or $\Phi 2/\Phi 1 \leq 0.65$.

According to an alternative embodiment, an optical lens is provided. The optical lens, in order from an object side to an image-forming side, includes a first lens, a second lens, a third lens, a fourth lens, a composite lens and a seventh lens. The composite lens has negative refractive power. The object-side surface of the first lens has an effective diameter $\Phi 1$. The object-side surface of the second lens has an effective diameter $\Phi 2$. $0.2 \leq \Phi 2/\Phi 1$ and/or $\Phi 2/\Phi 1 \leq 0.65$.

According to the above embodiments, the optical lens may feature both wide viewing angle and short total length.

BRIEF DESCRIPTION OF THE DRAWINGS

FIG. 4A lists each lens parameter of the optical lens of FIG. 1 of the present invention.

FIG. 4B lists coefficients of the mathematic equation of the aspheric surfaces of the optical lens of FIG. 1 of the present invention.

FIG. 5A lists each lens parameter of the optical lens of FIG. 2 of the present invention.

FIG. 5B lists coefficients of the mathematic equation of the aspheric surfaces of the optical lens of FIG. 2 of the present invention.

FIG. 6 lists optical information of the optical lenses OL1 and OL2 of FIGS. 4A, 4B, 5A and 5B.

DETAILED DESCRIPTION

Figure 1:
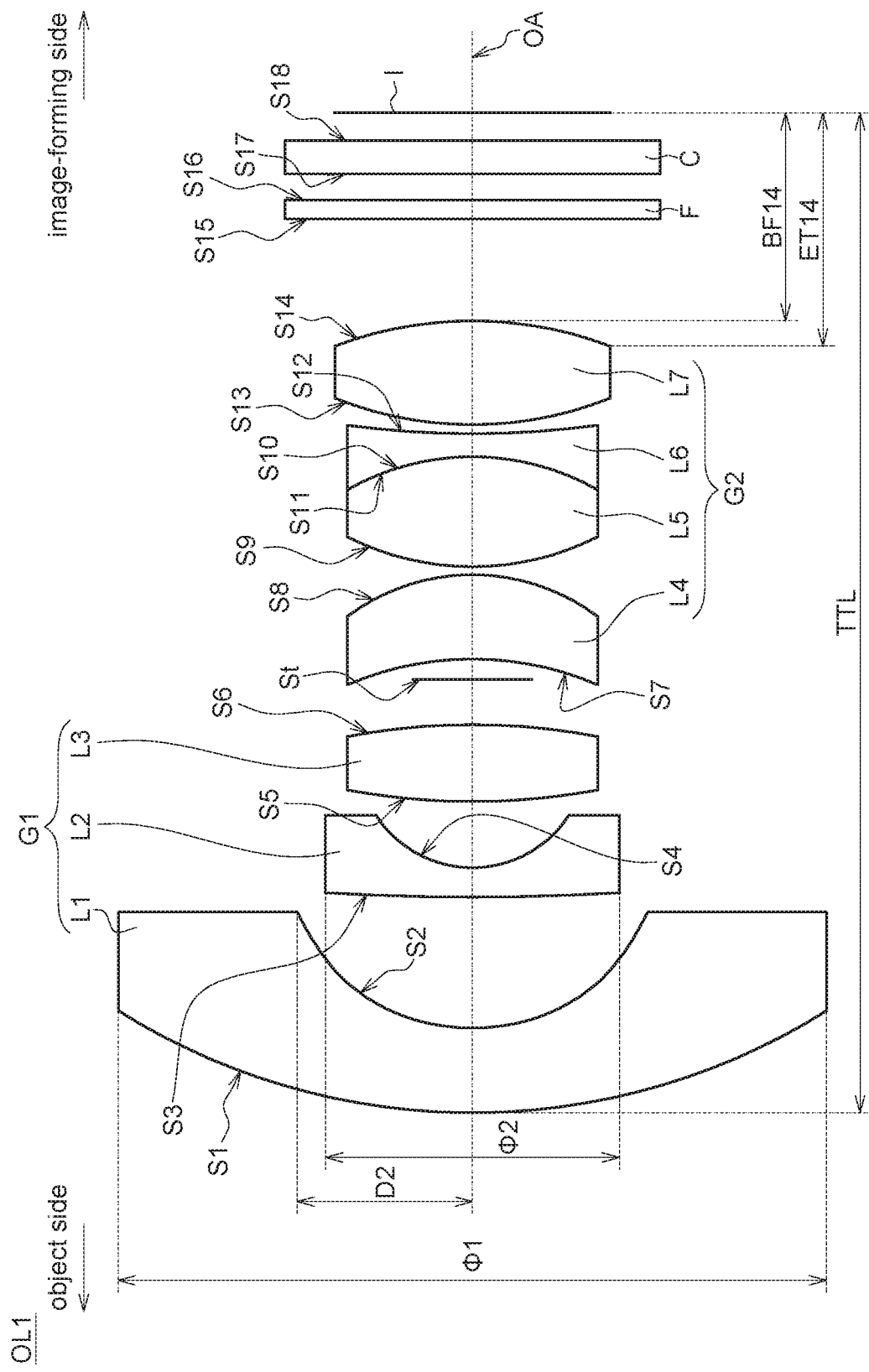
FIG. 1 shows an optical lens according to one embodiment of the present invention.

The embodiments of the present invention are described in details with reference to the accompanying drawings. In the following detailed description, for purposes of explanation, numerous specific details are set forth in order to provide a thorough understanding of the disclosed embodiments. It should be understood, however, that these details are not intended to limit the invention. In other words, these details are not required in some embodiments of the present invention. Furthermore, well-known structures and elements are schematically shown in order to simplify the drawing.

Figure 2:
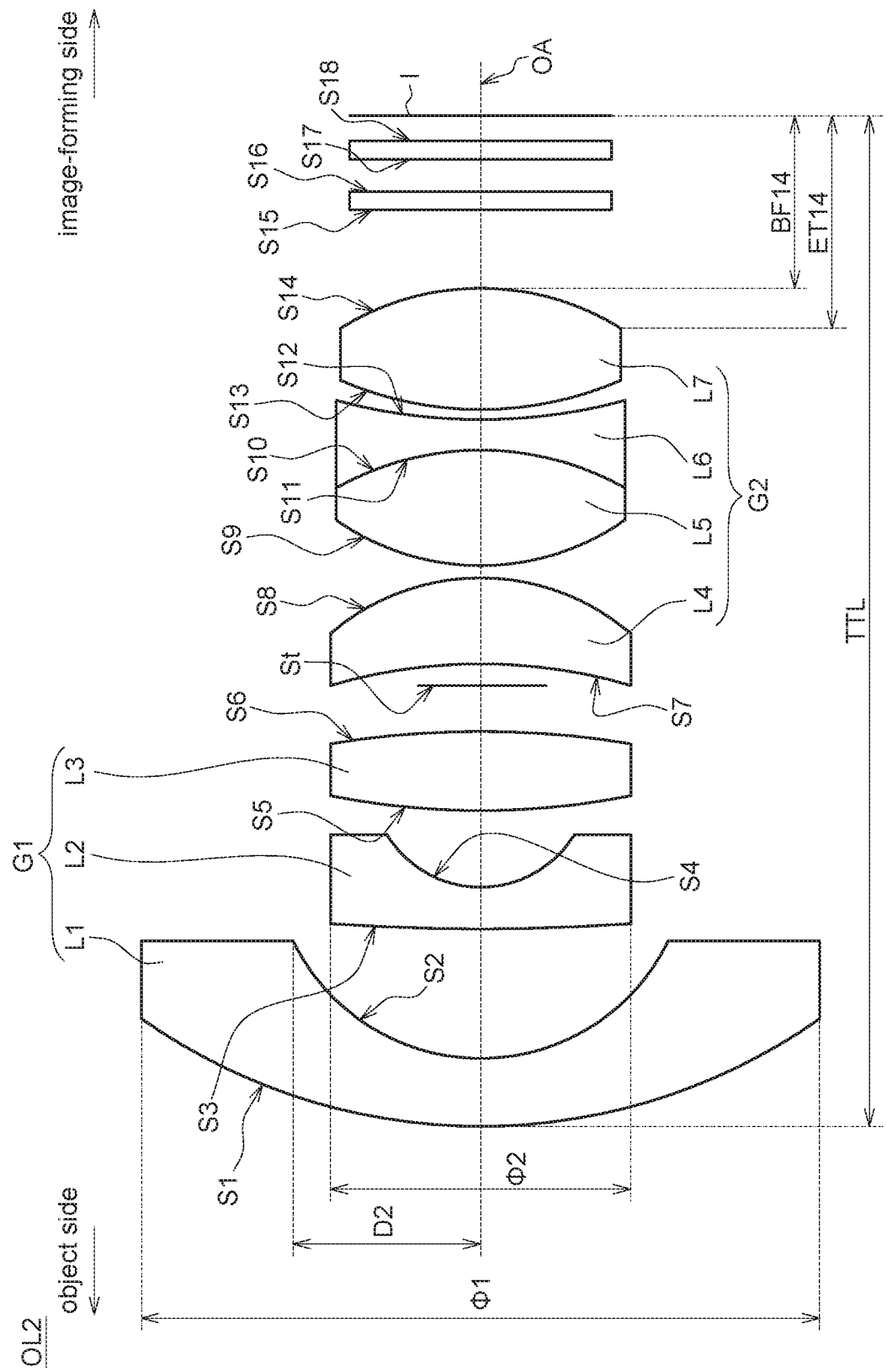
FIG. 2 shows an optical lens according to another embodiment of the present invention.

FIG. 1 shows an optical lens OL1 according to one embodiment of the present invention. FIG. 2 shows an optical lens OL2 according to another embodiment of the present invention. To show the features of the present embodiment, only the structure related to the present embodiment is shown, and the rest of the structure is omitted. The optical lenses OL1 and OL2 may be a wide-angle prime lens or a wide-angle zoom lens which may be applied to a device capable of image projection or image capture, the device including but not limited to a handheld communication system, an aerial camera, a sports camera lens, a camera lens for vehicle, a surveillance system, a digital camera, a digital video camera or a projector.

In one embodiment, the optical lenses OL1 and OL2 may include, in order from an object side to an image-forming side, a first lens group G1 and a second lens group G2. The first lens group G1 has negative refractive power and includes a plurality of lenses. The second lens group G2 has refractive power, such as positive refractive power or negative refractive power, and includes a plurality of lenses.

As shown in FIG. 1 and FIG. 2, the first lens group G1 may include three lenses. The second lens group G2 may include four lenses, and a plurality of lenses among the four lenses may form a composite lens (not designated). The composite lens may consist of two or more lenses. However, the present invention is not limited thereto.

In one embodiment, the first lens group G1 may include three lenses, two of which have negative refractive power and the other has positive refractive power. In another embodiment, the second lens group G2 may include four lenses, three of which have positive refractive power and the other may have negative refractive power.

Referring to FIG. 1 and FIG. 2, the first lens group G1 includes, in order from the object side to the image-forming side, a first lens L1, a second lens L2 and a third lens L3. The second lens group G2 includes, in order from the object side to the image-forming side, a fourth lens L4, a fifth lens L5, a sixth lens L6 and a seventh lens L7.

Specifically, the first lens L1, the second lens L2 and the sixth lens L6 may have negative refractive power. The third lens L3, the fourth lens L4, the fifth lens L5 and the seventh lens L7 may have positive refractive power. In addition, each lens may be arranged along the optical axis OA. Furthermore, as shown in FIG. 1 and FIG. 2, the fifth lens L5 and the sixth lens L6 may form the composite lens, and the image-side surface S10 of the fifth lens L5 matches the object-side surface S11 of the sixth lens L6. In other words, if the image-side surface S10 is convex towards the image-forming side, the object-side surface S11 is concave towards the image-forming side. If the image-side surface S10 is concave towards the object side, the object-side surface S11 is convex towards the object side. Furthermore, the composite lens may have negative refractive power.

As shown in FIG. 1 and FIG. 2, the third lens L3 may be the lens which is closest to the image-forming side among the first lens group G1, but the present invention is not limited thereto. In another embodiment, there may be one or more lenses having refractive power (not shown) between the third lens L3 and the fourth lens L4; or, there may be one or more lenses having refractive power (not shown) between the first lens L1 and the second lens L2; or, there may be one or more lenses having refractive power (not shown) between the second lens L2 and the third lens L3. The seventh lens L7 may be the lens which is closest to the image-forming side among the second lens group G2, but the present invention is not limited thereto. In another embodiment, there may be one or more lenses having refractive power (not shown) between the seventh lens L7 and the imaging plane I. On the other hand, there may be one or more lenses having refractive power (not shown) between any two lenses of the fourth lens L4, the fifth lens L5, the sixth lens L6 and the seventh lens L7.

In one embodiment, the object-side surface S1 of the first lens L1 has an effective diameter $\Phi 1$, the object-side surface S3 of the second lens L2 has an effective diameter $\Phi 2$, and the optical lenses OL1 and OL2 may satisfy at least one of the following conditions: $0.2 \le \Phi 2/\Phi 1$, $0.3 \le \Phi 2/\Phi 1$, $0.4 \le \Phi 2/\Phi 1$, $0.41 \le \Phi 2/\Phi 1$, $\Phi 2/\Phi 1 \le 0.44$, $\Phi 2/\Phi 1 \le 0.45$, $\Phi 2/\Phi 1 \le 0.5$, $\Phi 2/\Phi 1 \le 0.55$, $\Phi 2/\Phi 1 \le 0.6$ and $\Phi 2/\Phi 1 \le 0.65$.

In one embodiment, the image-side surface S2 of the first lens L1 has a curvature radius R2 and an effective radius D2, and the optical lenses OL1 and OL2 may satisfy at least one of the following conditions: $0.65 \le D2/R2$, $0.7 \le D2/R2$, $0.75 \le D2/R2$, $0.8 \le D2/R2$, $0.85 \le D2/R2$, $0.89 \le D2/R2$, $D2/R2 \le 0.916$, $D2/R2 \le 0.92$, $D2/R2 \le 0.95$, $D2/R2 \le 1$ and $D2/R2 \le 1.2$.

In one embodiment, the optical lenses OL1 and OL2 each has a focal length F. The optical lenses OL1 and OL2 may satisfy at least one of the following conditions: $1.5 \le |F1-F2|/F$, $1.8 \le |F1-F2|/F$, $2 \le |F1-F2|/F$, $2.16 \le |F1-F2|/F$, $|F1-F2|/F \le 3.36$, $|F1-F2|/F \le 3.5$, $|F1-F2|/F \le 3.8$, $|F1-F2|/F \le 4$ and $|F1-F2|/F \le 4.5$. Specifically, the focal length F may be the total focal length of the first lens L1, the second lens L2, the third lens L3, the fourth lens L4, the fifth lens L5, the sixth lens L6 and the seventh lens L7. In addition, F1 is the focal length of the first lens L1, and F2 is the focal length of the second lens L2.

In one embodiment, F12 is the total focal length of the first lens L1 and the second lens L2, F34 is the total focal length of the third lens L3 and the fourth lens L4, and D34 is the distance between the image-side surface S6 of the third lens L3 and the object-side surface S7 of the fourth lens L4. The optical lenses OL1 and OL2 may satisfy at least one of the following conditions: $0.85 \le (F12+F34-D34)$, $1 \le (F12+F34-D34)$, $1.2 \le (F12+F34-D34)$, $(F12+F34-D34) \le 1.5$, $(F12+F34-D34) \le 1.75$ and $(F12+F34-D34) \le 2$. D34 may be the distance between the center of the image-side surface S6 of the third lens L3 and the center of the object-side surface S7 of the fourth lens L4; or, D34 may be the length from the image-side surface S6 of the third lens L3 to the object-side surface S7 of the fourth lens L4 along the optical axis OA.

In one embodiment, ET34 is the distance between the edge of the image-side surface S6 of the third lens L3 and the edge of the object-side surface S7 of the fourth lens L4, D34 is the distance between the image-side surface S6 of the third lens L3 and the object-side surface S7 of the fourth lens L4, and CT3 is the thickness of the third lens L3. The optical lenses OL1 and OL2 may satisfy at least one of the following conditions: $0.65 \le |D34-ET34-CT3|$, $0.7 \le |D34-ET34-CT3|$, $0.73 \le |D34-ET34-CT3|$, $0.76 \le |D34-ET34-CT3|$, $|D34-ET34-CT3| \le 0.93$, $|D34-ET34-CT3| \le 0.95$, $|D34-ET34-CT3| \le 1$, $|D34-ET34-CT3| \le 1.05$ and $|D34-ET34-CT3| \le 1.1$. In one more specific embodiment, CT3 may be the thickness at the central of the third lens L3; or, CT3 may be the length from the object-side surface S5 to the image-side surface S6 of the third lens L3 along the optical axis OA.

Furthermore, in one more specific embodiment, D34 may be the distance between the center of the image-side surface S6 of the third lens L3 and the center of the object-side surface S7 of the fourth lens L4; or, D34 may be the length from the image-side surface S6 of the third lens L3 to the object-side surface S7 of the fourth lens L4 along the optical axis OA; or, D34 may be the distance between the center of the image-side surface of the first lens group G1 and the center of the object-side surface of the second lens group G2; or D34 may be the length from the image-side surface of the first lens group G1 to the object-side surface of the second lens group G2 along the optical axis OA.

Furthermore, in one more specific embodiment, ET34 may be the length between the outer edge of the effective diameter of the image-side surface S6 of the third lens L3 and the outer edge of the effective diameter of the object-side surface S7 of the fourth lens L4; or, ET34 may be the length between the outer edge of the effective diameter of the image-side surface of the first lens group G1 and the outer edge of the effective diameter of the object-side surface of the second lens group G2.

Figure 3B:
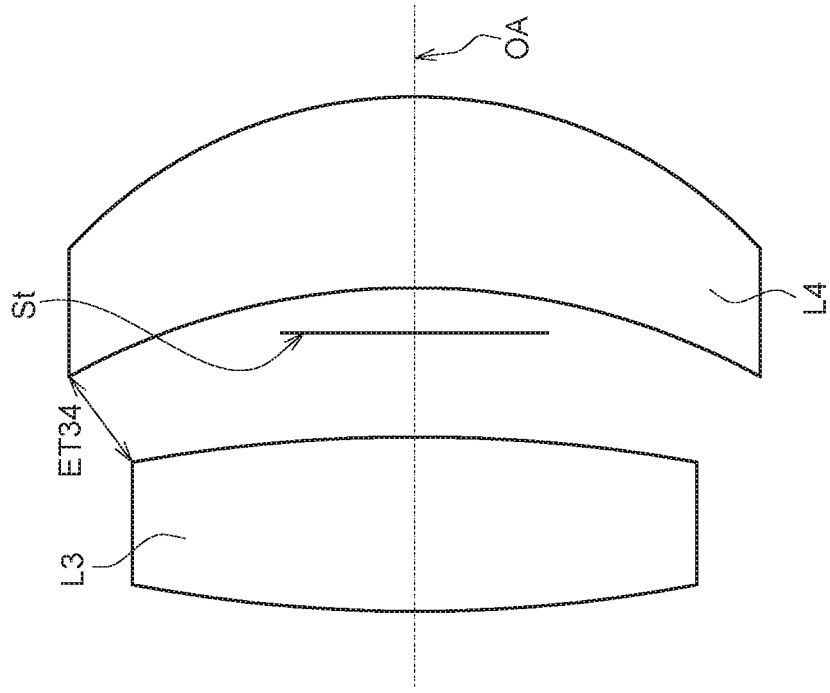
FIG. 3B shows a third lens, a fourth lens and a distance ET34 according to another embodiment of the present invention.
Figure 3A:
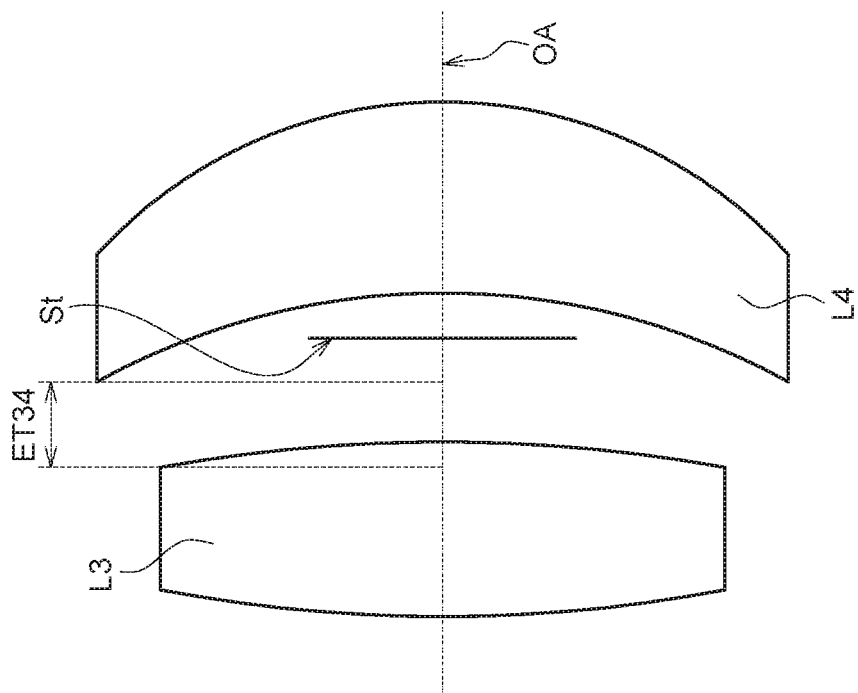
FIG. 3A shows a third lens, a fourth lens and a distance ET34 according to one embodiment of the present invention.

FIG. 3A shows the third lens L3, the fourth lens L4 and the distance ET34 according to one embodiment of the present invention. FIG. 3B shows the third lens L3, the fourth lens L4 and the distance ET34 according to another embodiment of the present invention. FIG. 3A and FIG. 3B are described with the third lens L3 and the fourth lens L4 having different effective diameters, but the present invention is not limited thereto. As shown in FIG. 1 and FIG. 2, the third lens L3 and the fourth lens L4 may also have the same effective diameter.

As shown in FIG. 3A, ET34 is defined as the vertical distance between the end point of the outer edge of the effective diameter of the image-side surface S6 of the third lens L3 and the end point of the outer edge of the effective diameter of the object-side surface S7 of the fourth lens L4. As shown in FIG. 3B, ET34 is defined as the linear distance between the end point of the outer edge of the effective diameter of the image-side surface S6 of the third lens L3 and the end point of the outer edge of the effective diameter of the object-side surface S7 of the fourth lens L4. However, the present invention is not limited thereto. On the other hand, for the first lens group G1 and the second lens group G2, ET34 may also be the vertical distance or the linear distance between the end point of the outer edge of the effective diameter of the image-side surface of the first lens group G1 and the end point of the outer edge of the effective diameter of the object-side surface of the second lens group G2.

In one embodiment, ET4 is the thickness at the edge of the fourth lens L4, and CT4 is the thickness at the central of the fourth lens L4. The optical lenses OL1 and OL2 may satisfy at least one of the following conditions: 0≤ET4/CT4, 0.15≤ET4/CT4, 0.2≤ET4/CT4, 0.25≤ET4/CT4, 0.3≤ET4/CT4, 0.31≤ET4/CT4, ET4/CT4≤0.79, ET4/CT4≤0.82, ET4/CT4≤0.85, ET4/CT4≤0.9, ET4/CT4≤0.95, ET4/CT4≤1 and ET4/CT4≤1.1. In one more specific embodiment, ET4 may be the thickness at the edge of the effective diameter of the fourth lens L4. In another specific embodiment, CT4 may be the length from the object-side surface S7 to the image-side surface S8 of the fourth lens L4 along the optical axis OA.

In one embodiment, the optical lenses OL1 and OL2 may satisfy at least one of the following conditions: 0.25≤δ14, 0.3≤δ14, 0.36≤δ14, δ14≤0.41, δ14≤0.45 and δ14≤0.5, wherein δ14=BF14/ET14. BF14 may be the distance between the center of the image-side surface S14 of the seventh lens L7 and the imaging plane I. BF14 includes but is not limited to the length from the image-side surface S14 of the seventh lens L7 to the imaging plane I along the optical axis OA. ET14 may be the distance between the outer edge of the effective diameter of the image-side surface S14 of the seventh lens L7 and the imaging plane I.

In one embodiment, the optical lenses OL1 and OL2 may satisfy at least one of the following conditions: 10 mm≤TTL, 15 mm≤TTL, TTL≤25 mm and TTL≤35 mm. TTL may be the distance between the object-side surface of the lens which is closest to the object side among the optical lenses OL1 or OL2 and the imaging plane I; or, TTL may be the distance from the object-side surface S1 of the first lens L1 to the imaging plane I. In one specific embodiment, TTL is the length from the object-side surface of the first lens group G1 to the imaging plane I; or, TTL is the distance from the object-side surface S1 of the first lens L1 to the imaging plane I; or, TTL is the length from the object-side surface S1 of the first lens L1 to the imaging plane I along the optical axis OA.

The optical lenses OL1 and OL2 further have a field of view FOV. In one embodiment, the optical lenses OL1 and OL2 may satisfy at least one of the following conditions: 180°≤FOV, 190°≤FOV, FOV≤210° and FOV≤220°.

Furthermore, in one embodiment, the first lens L1, the second lens L2, the third lens L3, the fourth lens L4, the fifth lens L5, the sixth lens L6 and the seventh lens L7 may be glass lenses, and the glass lens may be made of glass material. In another embodiment, at least one of the above lenses may be a plastic lens, and the plastic lens may be made of plastic material. The plastic material may include but may not be limited to polycarbonate, cyclic olefin copolymer (such as APEL), polyester resin (such as OKP4 and OKP4HT) and so on, or may be a mixture and/or a compound material including at least one of the foregoing three materials.

In one embodiment, the first lens L1, the second lens L2, the third lens L3, the fourth lens L4, the fifth lens L5, the sixth lens L6 and the seventh lens L7 may respectively be a spherical lens, a free-form lens or an aspheric lens. For example, the first lens L1, the second lens L2, the third lens L3, the fourth lens L4, the fifth lens L5 and the sixth lens L6 are spherical lenses, and the seventh lens L7 is an aspheric lens or a free-form lens.

Specifically, each of the free-form lenses has at least one free-form surface; that is, an object-side surface and/or an image-side surface of the free-form lens are/is the free-form surface(s). Each of the aspheric lenses has at least one aspheric surface; that is, an object-side surface and/or an image-side surface of the aspheric lens are/is the aspheric surface(s). And, each of the aspheric surfaces satisfies the following mathematic equation.

$$Z = \left[\frac{(C*Y^2)}{1+\sqrt{1-(K+1)C^2Y^2}}\right] + \sum(A_i * Y^i)$$

where Z is the coordinate in the optical axis OA direction, and the direction in which light propagates is designated as positive; $A_i$ is the aspheric coefficient, wherein i=4, 6, 8, 10 or 12; K is coefficient of quadratic surface; C=1/R, wherein R is the curvature radius; Y is the coordinate in a direction perpendicular to the optical axis OA, in which the upward direction away from the optical axis OA is designated as positive. In addition, each of the parameters or the coefficients of the equation of each of the aspheric surfaces may be independent of one another.

As shown in FIG. 1 and FIG. 2, the object-side surfaces S1 and S3 and the image-side surfaces S2 and S4 of the first lens L1 and the second lens L2 may have positive refractive rate. The object-side surfaces S1 and S3 may respectively be a convex surface convex towards the object side. The image-side surfaces S2 and S4 may respectively be a concave surface concave towards the object side. Further, the first lens L1 and the second lens L2 may respectively be a lens having refractive power, the lens including but not limited to a convex-concave glass lens or a convex-concave plastic lens having negative refractive power. For example, the first lens L1 and the second lens L2 may respectively be a convex-concave glass or a convex-concave plastic lens having negative refractive power. The object-side surfaces S1 and S3 and the image-side surfaces S2 and S4 may be spherical surfaces, or at least one of them is an aspheric surface or a free-form surface.

Secondly, the object-side surfaces S5, S9 and S13 the third lens L3, the fifth lens L5 and the seventh lens L7 may have positive refractive rate, and may respectively be a convex surface convex towards the object side. The image-side surfaces S6, S10 and S14 may have negative refractive rate, and may respectively be a convex surface convex towards the image-forming side. For example, the third lens L3, the fifth lens L5 and the seventh lens L7 may respectively be a biconvex glass lens and a biconvex plastic lens having positive refractive power. The object-side surfaces S5, S9 and S13 and the image-side surfaces S6, S10 and S14 may be spherical surfaces, or at least one of them is an aspheric surface or a free-form surface.

Furthermore, the object-side surface S7 and the image-side surface S8 of the fourth lens L4 may both have negative refractive rate. The object-side surface S7 may be a concave surface concave towards the image-forming side, and the image-side surface S8 may be a convex surface convex towards the image-forming side. For example, the fourth lens L4 may be a concave-convex glass lens or a concave-convex plastic lens having positive refractive power. The object-side surface S7 and the image-side surface S8 may both be spherical surfaces, or at least one of them is an aspheric surface or a free-form surface.

In addition, the object-side surface S11 of the sixth lens L6 may have negative refractive rate, and may be a concave surface concave towards the image-forming side. The image-side surface S12 may have positive refractive rate, and may be a concave surface concave towards the object side. For example, the sixth lens L6 may be a biconcave glass lens or a biconcave plastic lens having negative refractive power. The object-side surface S11 and the image-side surface S12 may both be spherical surfaces, or at least one of them is an aspheric surface or a free-form surface.

Furthermore, the optical lenses OL1 and OL2 may further include a stop St and/or a protection film C. An image capturing unit (not shown) may be further disposed on the imaging plane I for photo-electrically converting light beams passing through the optical lenses OL1 and OL2. The stop St may be arranged between any two of the lenses L1-L7, on the object side of the first lens L1, or between the seventh lens L7 and the imaging plane I of the optical lenses OL1 and OL2. For example, the stop St may be arranged between the third lens L3 and the fourth lens L4, but the present invention is not limited thereto. The protection film C may be arranged between the seventh lens L7 and the imaging plane I.

On the other hand, the optical lenses OL1 and OL2 may further include a filter film F. The filter film F may be arranged between the seventh lens L7 and the protection film C. Furthermore, in another embodiment, the functions of protecting the image capturing unit and filtering the infrared light may both be integrated into the protection film C. Thus, the filter film F may be omitted.

FIG. 4A lists each lens parameter of the optical lens OL1 of FIG. 1 of the present invention. FIG. 4A includes the curvature radius, the thickness, the refractive index, the material, the Abbe number (coefficient of chromatic dispersion), and so on of each of the lenses. The surface numbers are sequentially ordered from the object side to the image-forming side. For example, "St" stands for the stop St, "S1" stands for the object-side surface S1 of the first lens L1, "S2" stands for the image-side surface S2 of the first lens L1, . . . , "S15" and "S16" respectively stand for the object-side surface S15 and the image-side surface S16 of the filter film F, "S17" and "S18" respectively stand for the object-side surface S17 and the image-side surface S18 of the protection film C, and so on. In addition, the "thickness" stands for the distance between an indicated surface and an adjacent surface close to the image-forming side. For example, the "thickness" of the object-side surface S1 is the distance between the object-side surface S1 of the first lens L1 and the image-side surface S2 of the first lens L1, and the "thickness" of the image-side surface S2 is the distance between the image-side surface S2 of the first lens L1 and the object-side surface S3 of the second lens L2.

FIG. 4B lists coefficients of the mathematic equation of the aspheric surfaces of the optical lens OL1 of FIG. 1 of the present invention. If the object-side surface S13 and the image-side surface S14 of the seventh lens L7 of the optical lens OL1 are aspheric surfaces, each of the coefficients for the mathematic equation of each aspheric surface may be listed as indicated in FIG. 4B.

FIG. 5A lists each lens parameter of the optical lens OL2 of FIG. 2 of the present invention, the definitions and meanings of which are substantially the same as those of FIG. 4A.

FIG. 5B lists coefficients of the mathematic equation of the aspheric surfaces of the optical lens OL2 of FIG. 2 of the present invention. If the object-side surface S13 and the image-side surface S14 of the seventh lens L7 of the optical lens OL2 are aspheric surfaces, each of the coefficients for the mathematic equation of each aspheric surface may be listed as indicated in FIG. 5B.

FIG. 6 lists optical information of the optical lenses OL1 and OL2 of FIGS. 4A, 4B, 5A and 5B.

From the above embodiments, with the optical lenses OL1 and OL2 having wide viewing angle, the total length TTL of the optical lenses OL1 and OL2 can be shortened as well. Therefore, the optical lenses OL1 and OL2 may feature both wide viewing angle and short total length.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An optical lens, in order from an object side to an image-forming side, comprising:
a first lens, a second lens, a third lens, a fourth lens, a fifth lens, a sixth lens and a seventh lens, an object-side surface of the first lens having an effective diameter $\Phi1$, an image-side surface of the first lens having a curvature radius R2 and an effective radius D2, an object-side surface of the second lens having an effective diameter $\Phi2$, and the optical lens satisfies at least one of the following conditions:

$0.2 \leq \Phi2/\Phi1$;

$\Phi2/\Phi1 \leq 0.65$;

$0.65 \leq D2/R2$; and $D2/R2 \leq 1.2$.

2. The optical lens according to claim 1, wherein F is a focal length of the optical lens, F1 is a focal lens of the first lens, F2 is a focal lens of the second lens, F12 is a total focal length of the first lens and the second lens, F34 is a total focal lens of the third lens and the fourth lens, D34 is a distance between an image-side surface of the third lens and an object-side surface of the fourth lens, and the optical lens satisfies at least one of the following conditions: $1.5 \leq |F1-F2|/F$, $|F1-F2|/F \leq 4.5$, $0.8 \leq (F12+F34-D34)$ and $(F12+F34-D34) \leq 2$.

3. The optical lens according to claim 1, further comprising an imaging plane, wherein BF14 is a distance between a center of an image-side surface of the seventh lens and the imaging plane, ET14 is a distance between an outer edge of an effective diameter of the image-side surface of the seventh lens and the imaging plane, and the optical lens satisfies at least one of the following conditions: $0.25 \leq BF14/ET14$ and $BF14/ET14 \leq 0.5$.

4. The optical lens according to claim 1, wherein ET34 is a distance between an edge of an image-side surface of the third lens and an edge of an object-side surface of the fourth lens, D34 is a distance between the image-side surface of the third lens and the object-side surface of the fourth lens, CT3 is a thickness of the third lens, ET4 is a thickness at an edge of the fourth lens, CT4 is a thickness at a central of the fourth lens, and the optical lens satisfies at least one of the following conditions: $0.65 \leq |D34-ET34-CT3|$, $|D34-ET34-CT3| \leq 1.1$, $0 < ET4/CT4$ and $ET4/CT4 \leq 1.1$.

5. The optical lens according to claim 1, further comprising an imaging plane and a field of view FOV, TTL is a distance between an object-side surface of a lens which is closest to the object side and the imaging plane, and the optical lens satisfies at least one of the following conditions: $180° \leq FOV$, $FOV \leq 220°$, $10 \text{ mm} \leq TTL$ and $TTL \leq 35 \text{ mm}$.

6. The optical lens according to claim 1, wherein the optical lens satisfies at least one of the following conditions:
   two of the first lens, the second lens and the third lens have negative refractive power, and the other one has positive refractive power; and
   three of the fourth lens, the fifth lens, the sixth lens and the seventh lens have positive refractive power, and the other one has negative refractive power.

7. The optical lens according to claim 1, wherein the optical lens satisfies at least one of the following conditions:
   at least one of the first lens, the second lens, the third lens, the fourth lens, the fifth lens and the sixth lens is a spherical lens;
   the seventh lens is an aspheric lens or a free-form lens;
   the first lens is a convex-concave lens;
   the second lens is a convex-concave lens;
   the third lens is a biconvex lens;
   the fourth lens is a concave-convex lens;
   the fifth lens is a biconvex lens;
   the sixth lens is a biconcave lens; and
   the seventh lens is a biconvex lens.

8. An optical lens, in order from an object side to an image-forming side, comprising:
   a first lens, a second lens, a third lens, a fourth lens, a fifth lens, a sixth lens and a seventh lens, the first lens and the second lens having negative refractive power, the third lens and the seventh lens having positive refractive power, an object-side surface of the first lens having an effective diameter $\Phi 1$, an object-side surface of the second lens having an effective diameter $\Phi 2$, and $0.2 \leq \Phi 2/\Phi 1$ and/or $\Phi 2/\Phi 1 \leq 0.65$.

9. The optical lens according to claim 8, wherein an image-side surface of the first lens has a curvature radius R2 and an effective radius D2, and $0.65 \leq D2/R2$ and/or $D2/R2 \leq 1.2$.

10. The optical lens according to claim 8, wherein F is a focal length of the optical lens, F1 is a focal lens of the first lens, F2 is a focal lens of the second lens, F12 is a total focal length of the first lens and the second lens, F34 is a total focal lens of the third lens and the fourth lens, D34 is a distance between an image-side surface of the third lens and an object-side surface of the fourth lens, and the optical lens satisfies at least one of the following conditions: $1.5 \leq |F1-F2|/F$, $|F1-F2|/F \leq 4.5$, $0.8 \leq (F12+F34-D34)$ and $(F12+F34-D34) \leq 2$.

11. The optical lens according to claim 8, further comprising an imaging plane, wherein BF14 is a distance between a center of an image-side surface of the seventh lens and the imaging plane, ET14 is a distance between an outer edge of an effective diameter of the image-side surface of the seventh lens and the imaging plane, and the optical lens satisfies at least one of the following conditions: $0.25 \leq BF14/ET14$ and $BF14/ET14 \leq 0.5$.

12. The optical lens according to claim 8, wherein ET34 is a distance between an edge of an image-side surface of the third lens and an edge of an object-side surface of the fourth lens, D34 is a distance between the image-side surface of the third lens and the object-side surface of the fourth lens, CT3 is a thickness of the third lens, ET4 is a thickness at an edge of the fourth lens, CT4 is a thickness at a central of the fourth lens, and the optical lens satisfies at least one of the following conditions: $0.65 \leq |D34-ET34-CT3|$, $|D34-ET34-CT3| \leq 1.1$, $0 < ET4/CT4$ and $ET4/CT4 \leq 1.1$.

13. The optical lens according to claim 8, further comprising an imaging plane and a field of view FOV, TTL is a distance between an object-side surface of a lens which is closest to the object side and the imaging plane, and the optical lens satisfies at least one of the following conditions: $180° \leq FOV$, $FOV \leq 220°$, $10 \text{ mm} \leq TTL$ and $TTL \leq 35 \text{ mm}$.

14. The optical lens according to claim 8, wherein the optical lens satisfies at least one of the following conditions:
   at least one of the first lens, the second lens, the third lens, the fourth lens, the fifth lens and the sixth lens is a spherical lens;
   the seventh lens is an aspheric lens or a free-form lens;
   the first lens is a convex-concave lens;
   the second lens is a convex-concave lens;
   the third lens is a biconvex lens;
   the fourth lens is a concave-convex lens;
   the fifth lens is a biconvex lens;
   the sixth lens is a biconcave lens; and
   the seventh lens is a biconvex lens.

15. An optical lens, in order from an object side to an image-forming side, comprising:
   a first lens, a second lens, a third lens, a fourth lens, a composite lens and a seventh lens, the composite lens having negative refractive power, an object-side surface of the first lens having an effective diameter $\Phi 1$, an object-side surface of the second lens having an effective diameter $\Phi 2$, and $0.2 \leq \Phi 2/\Phi 1$ and/or $\Phi 2/\Phi 1 \leq 0.65$.

16. The optical lens according to claim 15, wherein an image-side surface of the first lens has a curvature radius R2 and an effective radius D2, and $0.65 \leq D2/R2$ and/or $D2/R2 \leq 1.2$.

17. The optical lens according to claim 15, wherein F is a focal length of the optical lens, F1 is a focal lens of the first lens, F2 is a focal lens of the second lens, F12 is a total focal length of the first lens and the second lens, F34 is a total focal lens of the third lens and the fourth lens, D34 is a distance between an image-side surface of the third lens and an object-side surface of the fourth lens, and the optical lens satisfies at least one of the following conditions: $1.5 \leq |F1-F2|/F$, $|F1-F2|/F \leq 4.5$, $0.8 \leq (F12+F34-D34)$ and $(F12+F34-D34) \leq 2$.

18. The optical lens according to claim 15, further comprising an imaging plane, BF14 is a distance between a center of an image-side surface of the seventh lens and the imaging plane, ET14 is a distance between an outer edge of an effective diameter of the image-side surface of the seventh lens and the imaging plane, and the optical lens satisfies at least one of the following conditions: $0.25 \leq BF14/ET14$ and $BF14/ET14 \leq 0.5$.

19. The optical lens according to claim 15, wherein ET34 is a distance between an edge of an image-side surface of the third lens and an edge of an object-side surface of the fourth lens, D34 is a distance between the image-side surface of the third lens and the object-side surface of the fourth lens, CT3 is a thickness of the third lens, ET4 is a thickness at an edge of the fourth lens, CT4 is a thickness at a central of the fourth lens, and the optical lens satisfies at least one of the following conditions: $0.65 \leq |D34-ET34-CT3|$, $|D34-ET34-CT3| \leq 1.1$, $0 < ET4/CT4$ and $ET4/CT4 \leq 1.1$.

20. The optical lens according to claim 15, further comprising an imaging plane and a field of view FOV, TTL is a distance between an object-side surface of a lens which is closest to the object side and the imaging plane, and the optical lens satisfies at least one of the following conditions: $180° \leq FOV$, $FOV \leq 220°$, $10\ mm \leq TTL$ and $TTL \leq 35\ mm$.

* * * * *